March 13, 1928.
O. F. WARHUS
1,662,092
CONTROL OF GASOLINE ELECTRIC POWER SYSTEMS
Filed Oct. 12, 1926
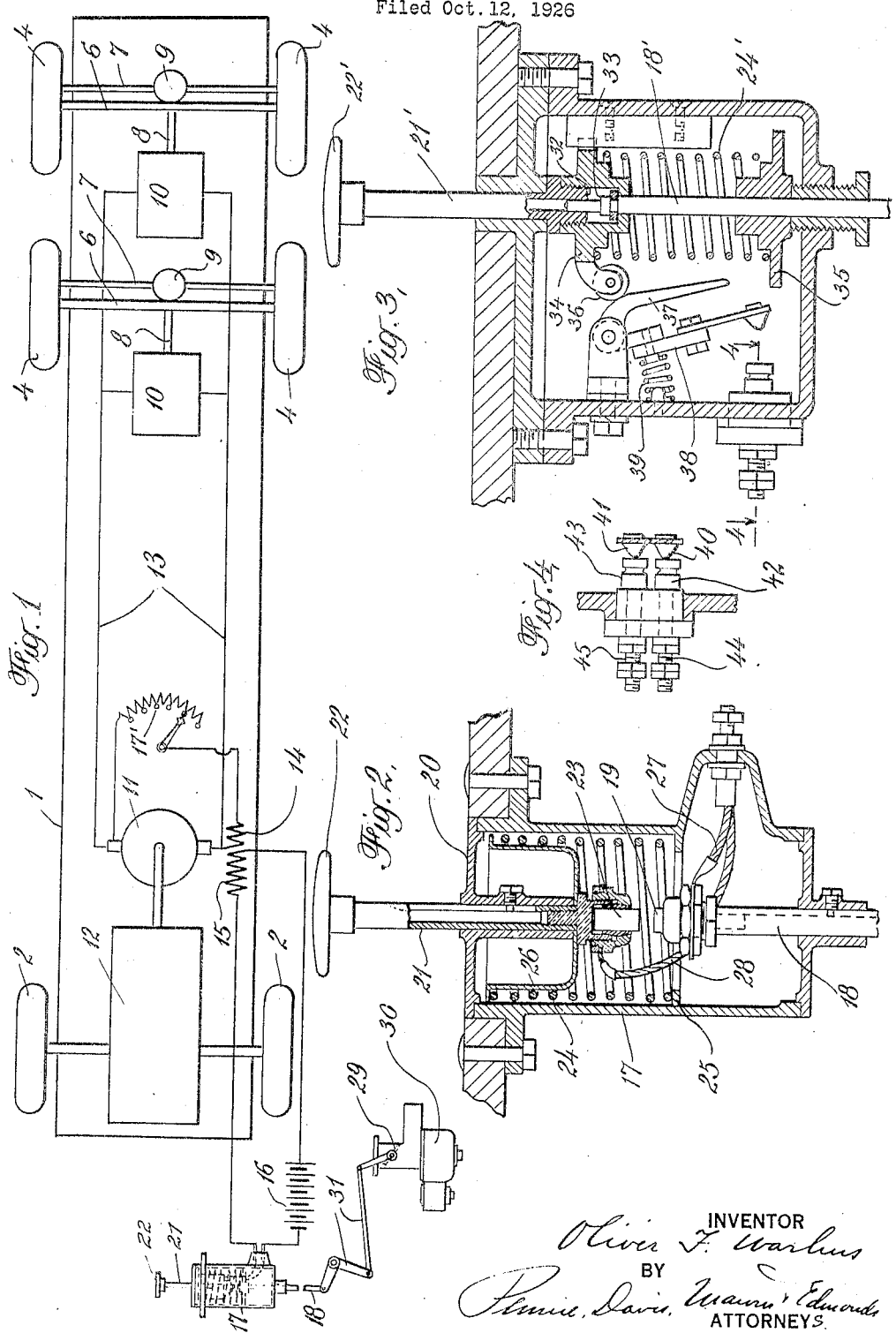

Patented Mar. 13, 1928.

1,662,092

UNITED STATES PATENT OFFICE.

OLIVER F. WARHUS, OF ALBANY, NEW YORK, ASSIGNOR TO VERSARE CORPORATION, A CORPORATION OF NEW YORK.

CONTROL OF GASOLINE ELECTRIC POWER SYSTEMS.

Application filed October 12, 1926. Serial No. 141,180.

This invention relates to the control of gasoline-electric power systems and particularly to that type which is used for the propulsion of vehicles. The invention also relates to control devices suitable for use not only in gasoline-electric power systems but also in other relations.

There are in use at the present time automobile coaches, trucks and other vehicles having a gasoline-electric drive, i. e. a drive which comprises an internal combustion engine mechanically connected with an electric generator which furnishes current to one or more electric motors geared to the traction wheels. In the operation of such vehicles it is often desirable to stop the vehicle without stopping the internal combustion engine, the engine being permitted to idle. Even when the engine is idling there is a small amount of current being delivered to the motor and therefore there is always a possibility of the vehicle moving or "creeping". This could be prevented by a separate controlling device to make sure that sufficient current will not be delivered to the motor to operate it when the engine is idling, but such an arrangement would not be foolproof and would require an additional operation to be performed by the operator upon stopping the vehicle.

According to this invention there is provided a fool-proof combined actuating device for controlling the throttle valve of the engine carburetor and for controlling the generator so that when the actuating device is in its normal position the engine is permitted to idle, but the current supplied by the generator to the motor will be cut off or at least reduced to so small an amount that there is no danger of the vehicle creeping. When the actuating device is operated it first renders the generator capable of furnishing sufficient current to the motor to propel it and thereafter it actuates the throttle valve of the engine carburetor to speed up the engine. When the control device is used on a vehicle it may be in the form of an accelerator pedal having an electric switch associated therewith connected in the field circuit of the generator. When the accelerator pedal is in its normal raised position the contacts are open and although the engine is permitted to idle the generator will be incapable of furnishing enough current to the motor to operate it. When the accelerator pedal is depressed it first closes the electric switch to place the generator in condition for furnishing enough current to the motor, and thereafter it actuates the throttle valve to speed up the engine. When pressure upon the accelerator pedal is released the reverse operation takes place, i. e. the engine is first slowed down to its idling speed and when the accelerator pedal is allowed to return all the way to its normal position the electric switch is opened to break the generator field circuit thus insuring that while the engine is idling the vehicle will not creep.

The accompanying drawings illustrate a gasoline-electric propulsion or driving system for a vehicle which is controlled in accordance with the invention and also illustrate several different forms of the controller per se.

In the drawings:

Fig. 1 is a diagrammatic view of a six wheel vehicle having a gasoline-electric drive controlled in accordance with the invention;

Fig. 2 is a vertical section of one form of controlling device;

Fig. 3 is a vertical section of a modified form of controlling device; and

Fig. 4 is a horizontal section taken on the line 4—4 of Fig. 3 but showing the switch in its closed position.

Fig. 1 shows the invention as applied to a six wheel vehicle having two individual motors for driving the two rear axles. However, the invention is equally applicable to a gasoline-electric drive of any vehicle regardless of the number of motors employed. For instance, the vehicle may have only four wheels with one motor for driving the two rear wheels or the vehicle may be an eight wheel vehicle in which the body is mounted upon front and rear bogie trucks each of which is provided with a driving motor. The type of vehicle shown in Fig. 1 comprises a body 1 mounted upon front steering wheels 2 and four rear wheels indicated at 4. Each pair of rear wheels is mounted upon a dead axle 6 and is driven from a live axle 7 geared to a propeller shaft 8 through differential gearing 9. Each propeller shaft 8 is driven by an electric motor 10. The connections from each motor to the corresponding traction wheels are shown more or less diagrammatically as they do not form a part of the present invention. For the present purpose it is sufficient to note that there is at least one electric motor that drives at least one pair of rear wheels. The driving system for the vehicle also includes an electric generator represented diagrammatically at 11 which is mechanically connected with an internal combustion engine represented diagrammatically at 12. The two electric motors 10 are connected in parallel and are electrically connected with the generator by the conductors 13. In the present instance the generator is of that type whose main field winding 14 is augmented by a separate so-called tickler field winding 15 energized by means of a storage battery 16. The main field winding 14 may be controlled by means of a controller represented diagrammatically at 17' so as to vary the output of the generator. The separately excited tickler field winding 15 has the usual function of increasing the output of the generator for slow speeds and of causing the generator output to build up in quick response to an increase in speed. However, the presence of the separately excited tickler field makes it possible for the generator, even when the engine is idling, to deliver enough current to the motors to operate them and it is therefore desirable to break the circuit of the field 15 when the engine is idling. When the engine is idling the main field 14, even when the controller 17' is in its maximum output position, will not cause the generator to furnish enough current to the motors to operate them and therefore it is not necessary to break the circuit of the main field 14 although this can be done if desired. Likewise, if the generator has only one field winding its circuit may be broken to render the generator entirely ineffective.

The circuit of the tickler field 15 is controlled from the accelerator pedal which operates the throttle valve of the engine carburetor. The accelerator pedal and the instrumentalities associated with it may comprise a casing 17 (Fig. 2) in the bottom of which there is slidingly mounted a rod 18 carrying at its upper end an electric contact 19. The cover 20 of the casing 17 slidingly carries an actuating rod 21 having a knob or the like 22 conveniently located near the driver's seat so that is may be actuated by his foot. The lower end of the actuating rod 21 is provided with a second electric contact 23. The actuating rod 21 is yieldingly held in its normal raised position by means of a coiled spring 24 positioned between a shoulder 25 on the casing 17 and a cup shaped member 26 carried by the rod 21. The contacts 19 and 23 are connected by means of leads 27 and 28 respectively to binding posts on the casing 17 which in turn are connected in the circuit of the tickler field 15 as shown in Fig. 1. The rod 18 is connected with the throttle valve 29 of the engine carburetor 30 through a system of links and levers diagrammatically represented at 31 in Fig. 1. In the normal positions of the actuating rod 21 and the movable rod 18 the contacts 19 and 23 are spaced apart and therefore the circuit of the tickler field is open. In the normal position of the parts the throttle valve 29 permits the engine to idle. When the operator depresses the actuating rod 21 the contacts 19 and 23 are first closed thereby completing the circuit of the tickler field 15 and placing the generator in condition to furnish sufficient current to the motors to operate them. Further movement of the rod 21 will depress the rod 18 and this will serve to open the throttle valve of the carburetor and speed up the engine. The speed of the engine may be controlled in the usual way by varying the pressure upon the actuating rod 21. This will vary the speed of the generator and consequently vary the amount of current supplied to the motors so that any amount of desired power may be obtained from the generator to suit the traffic demand. When the operator reduces the pressure on the knob 22 to almost the minimum, or when the operator's foot is removed from the knob 22, the contacts 19 and 23 will separate thereby breaking the circuit of the tickler field 15 while still permitting the engine to idle. Of course the operator may stop the engine in the usual way if he desires by breaking the ignition circuit, but ordinarily in making short stops the operator will permit the engine to continue idling. During these stops there should be no danger of the generator furnishing enough current to the motors to operate them and this result is insured by the breaking of the tickler field 15. The device is entirely fool-proof inasmuch as the circuit of the tickler field will always be broken whenever the operator's foot is removed from the accelerator pedal and no additional operation is necessary on his part to render the generator ineffective as would be the case if it were necessary for him to operate a separate device for this purpose. The breaking of the circuit of the field 15 also has the additional advantage of decreasing the drain on the storage battery 16 because it is not called upon to furnish current while the engine is idling.

Fig. 3 shows a modified form of control device in which the actuating rod 21' actuates the rod 18' only after it has moved far enough to bring a shoulder 32 on the rod 21' into engagement with a shoulder 33 on the rod 18'. The actuating rod 21' is yieldingly held in its raised position by means of a coil spring 24' interposed between a collar 34 on the actuating rod 21' and a stationary collar 35. When the actuating rod 21' is depressed and before the shoulder 32 comes in contact with the shoulder 33 a roller 36 mounted on the collar 34 depresses an arm 37 associated with a switch 38 so as to move the switch to its closed position against the action of a biasing spring 39. The switch 38 carries two contacts 40 and 41 (Fig. 4) which in the closed position of the switch make engagement with two stationary contacts 42 and 43 mounted in the wall of the controller casing, but insulated therefrom. The binding posts 44 and 45 of the contacts 42 and 43 are connected in the circuit of the tickler field winding 15 so that when the switch is closed the contacts 42 and 43 will be bridged and thereby complete the circuit through the tickler field winding. The arrangement of parts is such that when the actuating rod 21' is actuated the switch just described will be quickly closed and further movement of the rod 21' will bring the shoulder 32 into engagement with the shoulder 33 and thereafter the rod 18' will be actuated to vary the position of the throttle valve, it being understood that this rod is connected with the throttle valve of the carburetor in the same manner as the rod 18 of Fig. 2. The speed of the engine may be varied by varying the pressure upon the knob 22' of the actuating rod 21' during which time the switch will be held closed but when pressure is reduced to a minimum on the knob 22' or when the operator's foot is moved altogether from this knob the engine is slowed down to idling speed and then the switch will open to break the circuit of the tickler field winding 15.

In both forms of the controller illustrated in the drawings only a very slight pressure is required to complete the circuit of the field winding of the generator because the distance between the contacts 19 and 23 in the case of Fig. 2 and between the shoulders 32 and 33 in the case of Fig. 3 is quite small in practice, one-quarter of an inch having been found sufficient for the purpose.

It will now be seen that the invention is of particular value in gasoline electric driving systems for vehicles as it positively insures that the vehicle will not creep when the engine is idling. However, the invention may be useful in any gasoline electric power system regardless of whether or not it is used as a propulsion system for vehicles. Moreover, the controlling device may be useful in other relations and systems of other types. For instance, the controller may be useful for breaking any electric circuit after the speed of an internal combustion engine or other device has been throttled down and for re-establishing the circuit before increasing the speed of the engine or other device. The details of construction of the controller itself are important only so far as the novelty of the controller is concerned. So far as the entire system is concerned the minor details of the controller are unimportant so long as one device controls the speed of the engine and also renders the generator incapable of furnishing enough current to the motor to operate it when the engine is idling.

I claim:

1. A controlling device for controlling an electric circuit and the throttle valve of an internal combustion engine comprising a movable member adapted to be connected with the throttle valve, a movable actuating device for said member having an initial movement independent of said member before it operates the same, and an electric switch having contacts associated with said controlling device and adapted to be connected in said electric circuit, said contacts being arranged to be closed by operation of the actuating device before the actuating device operates said movable member.

2. A control device comprising a movable member adapted to be connected with a device to be controlled, a movable actuating device for said member having an initial movement independent of said member before it operates the same, an electric switch associated with said control device having contacts arranged to be open in the normal position of said actuating device and closed upon actuation of said device before it operates said member.

3. A control device comprising a movable member adapted to be connected with a device to be controlled, a movable actuating device for said member having an initial movement independent of said member before it operates the same, an electric switch associated with said control device and which is normally open in the normal position of the actuating device and means operated by said actuating device for closing the switch before said member is operated by the actuating device.

4. A combined accelerator pedal and contactor for motor vehicles which have an internal combustion engine and an electric circuit to be controlled, comprising a movable member adapted to be connected with the throttle valve of the engine, a movable foot pedal for actuating said member having an initial movement independent of said member before it actuates it, and an electric switch having contacts arranged to be closed by operation of said foot pedal before the foot pedal operates said movable member.

In testimony whereof I affix my signature.

OLIVER F. WARHUS.